US009922245B2

United States Patent
Zhang et al.

(10) Patent No.: US 9,922,245 B2
(45) Date of Patent: Mar. 20, 2018

(54) METHOD AND SYSTEM FOR RECOGNIZING AN OBJECT

(71) Applicant: Konica Minolta Laboratory U.S.A., Inc., San Mateo, CA (US)

(72) Inventors: Yongmian Zhang, Union City, CA (US); Hung-Shou Tai, San Mateo, CA (US); Haisong Gu, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 363 days.

(21) Appl. No.: 14/461,057

(22) Filed: Aug. 15, 2014

(65) Prior Publication Data

US 2016/0048727 A1 Feb. 18, 2016

(51) Int. Cl.
  *G06K 9/00* (2006.01)
  *G06F 3/01* (2006.01)
  *H04N 5/33* (2006.01)
  *G06T 7/00* (2017.01)
  *G01B 11/24* (2006.01)
  *G06K 9/62* (2006.01)

(52) U.S. Cl.
  CPC ....... *G06K 9/00389* (2013.01); *G06K 9/6212* (2013.01); *H04N 5/332* (2013.01)

(58) Field of Classification Search
  USPC ........................................................ 348/164
  See application file for complete search history.

(56) References Cited

U.S. PATENT DOCUMENTS

| 6,128,003 | A | 10/2000 | Smith et al. | |
|---|---|---|---|---|
| 7,599,561 | B2 * | 10/2009 | Wilson | G03B 29/00 382/199 |
| 8,971,572 | B1 * | 3/2015 | Yin | G06K 9/00355 345/173 |
| 9,058,661 | B2 * | 6/2015 | Haker | G06K 9/00355 |

(Continued)

FOREIGN PATENT DOCUMENTS

WO  WO 2013/052880 A1  4/2013

OTHER PUBLICATIONS

Dean Rubine, Specifying Gestures by Example, Computer Graphics v25(4), 1991.

(Continued)

*Primary Examiner* — Jeremiah C Hallenbeck-Huber
*Assistant Examiner* — Susan E Hodges
(74) *Attorney, Agent, or Firm* — Buchanan Ingersoll & Rooney PC

(57) ABSTRACT

A method, a system, and a non-transitory computer readable medium for recognizing an object. The method includes emitting an array of infrared rays from an infrared emitter towards a projection region, the projection region including a first object; generating a reference infrared image by recording an intensity of ray reflection from the projection region without the first object; generating a target infrared image by recording the intensity of ray reflection from the projection region with the first object; comparing the target infrared image to the reference infrared image to generate a predetermined intensity threshold; and extracting the first object from the target infrared image, if the intensity of ray reflection of the target infrared image of the first object exceeds the predetermined intensity threshold.

13 Claims, 14 Drawing Sheets

(56) References Cited

U.S. PATENT DOCUMENTS

| | | | |
|---|---|---|---|
| 9,153,028 B2* | 10/2015 | Holz | G06K 9/3233 |
| 2007/0291135 A1* | 12/2007 | Baer | H04N 5/335 |
| | | | 348/231.99 |
| 2010/0177164 A1* | 7/2010 | Zalevsky | G01B 11/162 |
| | | | 348/46 |
| 2011/0288964 A1* | 11/2011 | Linder | B25J 9/1689 |
| | | | 705/27.1 |
| 2012/0242800 A1* | 9/2012 | Ionescu | G06F 3/017 |
| | | | 348/46 |
| 2012/0249422 A1* | 10/2012 | Tse | G06F 3/0304 |
| | | | 345/158 |
| 2012/0308140 A1* | 12/2012 | Ambrus | G06K 9/00362 |
| | | | 382/190 |
| 2013/0088461 A1 | 4/2013 | Shamaie | |
| 2013/0343601 A1* | 12/2013 | Jia | G06K 9/00355 |
| | | | 382/103 |
| 2014/0232631 A1* | 8/2014 | Fleischmann | G06F 3/017 |
| | | | 345/156 |
| 2014/0282274 A1* | 9/2014 | Everitt | G06F 3/017 |
| | | | 715/863 |

OTHER PUBLICATIONS

A. Licsár and T. Szirányi, Hand Gesture Recognition in Camera-Projector System, In Computer Vision in Human-Computer Interaction, ECCV 2004 Workshop on HCI, 2004.

Y. Sato, Y. Kobayashi and H. Koike, Fast Tracking of Hands and Fingertips in Infrared Images for Augmented Desk Interface, IEEE International Conference on Automatic Face and Gesture Recognition, Mar. 2000.

* cited by examiner

FIG. 12A    FIG. 12B
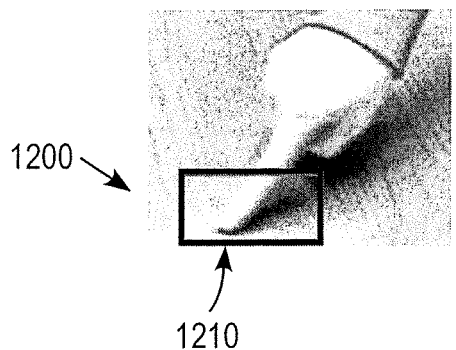 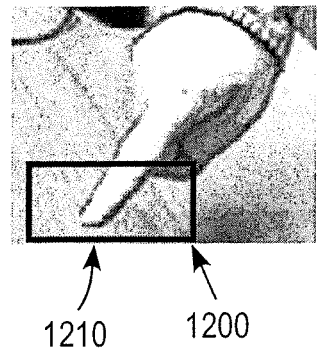
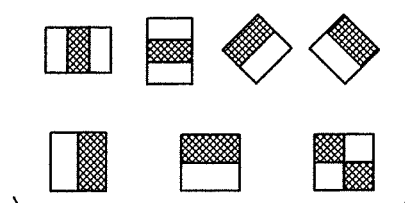
FIG. 13
FIG. 14A    FIG. 14B
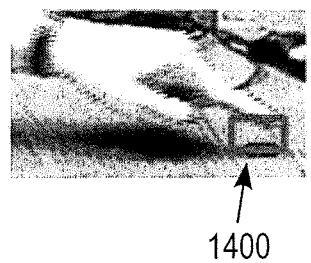 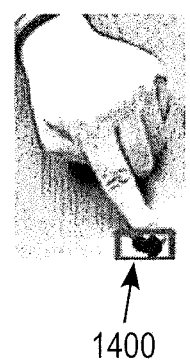

METHOD AND SYSTEM FOR RECOGNIZING AN OBJECT

FIELD

The present disclosure relates to a method and system for recognizing an object, and more particularly, a method and system for recognizing one or more fingers of a user.

BACKGROUND

A vision-based hand gesture recognition system, as reported in the proceeding of Computer Vision in Human-Computer Interaction, ECCV 2004 Workshop on HCI, May 16, 2004, entitled, "Hand Gesture Recognition in Camera-Projector System" authored by Licsár and Szirányi, provides a hand segmentation method for a camera-projector system to achieve an augmented reality tool. Hand localization is based on a background subtraction, which adapts to the changes of the projected background. Hand poses are described by a method based on modified Fourier descriptors, which involves distance metric for the nearest neighbor classification.

U.S. Pat. No. 6,128,003 A discloses a hand gesture recognition system and method that uses skin color to localize a hand in an image. Gesture recognition is performed based on template matching. Models of different hand gestures are built so that in real time, the unknown rotational vector can be compared to all models, the correct hand shape being the one with the smallest distance. To make model search more efficient, these models are arranged in a hierarchical structure according to their similarity to one another.

U.S. Pat. No. 7,599,561 B2 discloses a compact interactive tabletop with projection-vision system particularly for front-projected vision-based table systems for virtual reality purpose. The system utilizes an infrared LED illuminant to generate a finger shadow and use the shadow to detect whether finger touches the table surface or hover over the table surface.

"Fast tracking of hands and finger tips in infrared images for augmented desk interface" published in IEEE International Conference on Automatic Face and Gesture Recognition, Mar. 2000, Sato, Kobayashi and Koike introduced augmented desk interface system in which a user can use natural hand gestures to simultaneously manipulate both physical objects and electronically projected objects on a desk. An infrared camera is used to detect light emitted from a surface by setting the temperature range to approximate human body temperature (30° C. to 34° C.), so that image regions corresponding to human skin appear particularly bright in the images from the infrared camera.

SUMMARY

In accordance with an exemplary embodiment, a method is disclosed for recognizing an object, the method comprising: emitting an array of infrared rays from an infrared emitter towards a projection region, the projection region including a first object; generating a reference infrared image by recording an intensity of ray reflection from the projection region without the first object; generating a target infrared image by recording the intensity of ray reflection from the projection region with the first object; comparing the target infrared image to the reference infrared image to generate a predetermined intensity threshold; and extracting the first object from the target infrared image, if the intensity of ray reflection of the target infrared image of the first object exceeds the predetermined intensity threshold.

In accordance with an exemplary embodiment, a system is disclosed for recognizing an object, the system comprising: an infrared emitter configured to emit an array of infrared rays from an infrared emitter towards a projection region, the projection region including a first object; an infrared camera for recording an intensity of ray reflection from the projection region without the first object as a reference infrared image and the intensity of ray reflection of the projection region with the first object infrared image of the first object as a target infrared image; and a processor for: comparing the target infrared image to the reference infrared image to generate a predetermined intensity threshold; and extracting the first object from the target infrared image, if the intensity of ray reflection of the target infrared image of the first object exceeds the predetermined intensity threshold.

In accordance with an exemplary embodiment, a non-transitory computer readable medium containing a computer program having computer readable code embodied to carry out a method for recognizing an object is disclosed, the method comprising: emitting an array of infrared rays from an infrared emitter towards a projection region, the projection region including a first object; generating a reference infrared image by recording an intensity of ray reflection from the projection region without the first object; generating a target infrared image by recording the intensity of ray reflection from the projection region with the first object; comparing the target infrared image to the reference infrared image to generate a predetermined intensity threshold; and extracting the first object from the target infrared image, if the intensity of ray reflection of the target infrared image of the first object exceeds the predetermined intensity threshold.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 10A-10D illustrate a process for finding or determining a finger tip in accordance with an exemplary embodiment, wherein FIGS. 10A and 10C illustrate a hand pose, the deepest root, and the lower boundary of the palm, and FIGS. 10B and 10D illustrate the upper boundary of the palm and the gravity center of the palm (i.e., the center of the circle).

FIGS. 12A and 12B illustrate a touch finger and a hover finger, respectively.

FIG. 13 illustrates features used for a hove and touch detection using seven Haar-like features.

FIGS. 14A and 14B illustrate a superimposed box, which defines a contact region between a finger and a touch surface, wherein the pixels in blue are classified as a touch pixel.

DESCRIPTION OF THE PREFERRED EMBODIMENTS

In accordance with an exemplary embodiment, a system and method having an interactive user interface, which can enable users to actively operate digital contents on a surface in which the image is projected. For example, the system and method can allow a presenter or speaker to use his/her hands/fingers to directly interact with a projected image, and the system can recognize natural gesture-based commands.

One of the bottlenecks for this system is how to obtain clear hand segmentation from a changeable background under a variable light condition due to that the various objects project onto the surface. In addition, previous methods of color segmentation or background subtraction simply do not perform well.

In accordance with an exemplary embodiment, a method and system are disclosed for detecting and segmenting the hands from a variable background. With this technique, an interactive system is disclosed with a natural user interface to control and manipulate contents on the projected image on a surface, such as a table, a whiteboard, or a wall.

Figure 1:
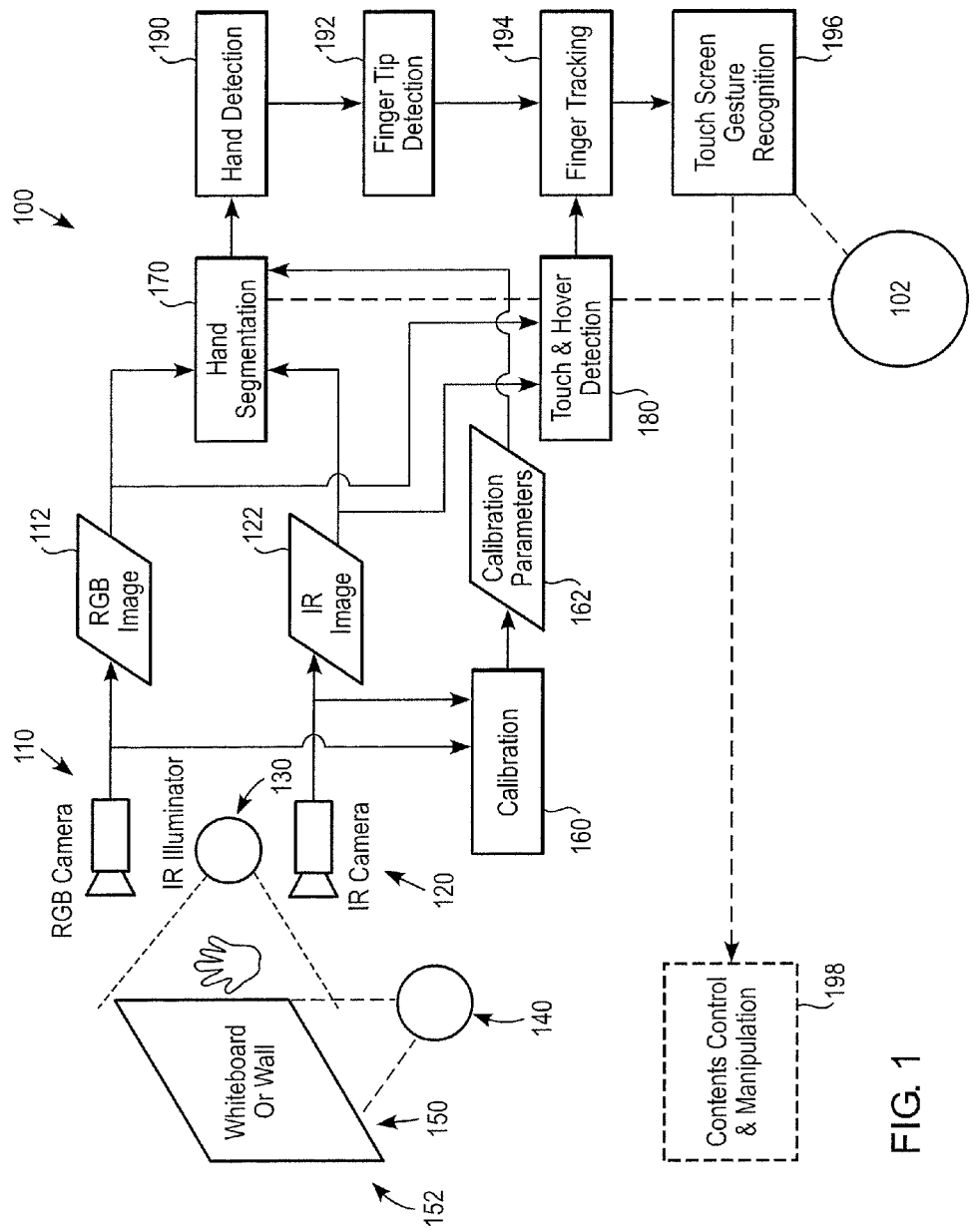
FIG. 1 is an illustration of a system for vision-based projector module in accordance with an exemplary embodiment, which includes a RGB (red, green, blue) camera and an IR (Infrared) camera.

FIG. 1 illustrates a system 100 in accordance with an exemplary embodiment. The system 100 can include a RGB camera 110, an infrared (IR) camera 120 with an IR pass filter, an IR emitter (or illuminator) 130, and a projector 140. The projector 140 can be configured to project or cast an image or content onto a surface of a table, a whiteboard, a wall, or the like 150.

In accordance with an exemplary embodiment, the RGB Camera 110 can be used for acquiring a color image 112 of a projection region 152. The projection region 152 preferably includes at least a portion of the image or content cast by the projector 140 and the presenter or speaker. The IR camera 120 can acquire the invisible infrared rays in the form of an IR image 122 generated by the IR emitter 130. In accordance with an exemplary embodiment, an IR pass filter (not shown) can increase the contrast of the IR image 122. The infrared (IR) emitter 130, for example, can be a laser diffractive optical element (DOE) similarly to that in an array of IR LEDs or a Kinect device, which is configured to cast a large number of pseudo-randomly arranged rays into an arbitrary projection region such as the surface of a table, a whiteboard or a wall 150. In accordance with an exemplary embodiment, for example, the projector 140 can project or casts the contents onto the table, whiteboard, or wall, and the rays can be only observed by the IR camera 120 through the IR pass filter.

In accordance with an exemplary embodiment, the RGB camera 110 and the IR camera 120 can be physically separate units, which can be pre-calibrated to within an acceptable pixel error so that the image coordinates of the IR camera can be precisely mapped to the image coordinate of RGB camera using a calibration module 160. The calibration module 160 can be configured to determine the relative positions of the RGB cameral 110 and the IR camera 120 based on one or more calibration parameters 162.

As shown in FIG. 1, the RGB image 112 received from the RGB camera 110 and the IR image 122 from the IR camera 120 can be processed via one or more modules 170, 180, 190, 192, 194, and 196, which can includes a hand segmentation module 170, a touch and hover detection module 180, a hand detection module 190, a finger tip detection module 192, a finger tracking module 194 and/or a touch screen gesture recognition module 196. In accordance with an exemplary embodiment, the results obtained from the hand segmentation module 170, the touch and hover module 180, the hand detection module 190, the finger tip detection module 192, the finger tracking module 194 and the touch screen gesture recognition module 196 can be fed into a content control and manipulation unit 198.

In accordance with an exemplary embodiment, each of the modules 170, 180, 190, 192, 194, 196 preferably includes a computer or processing device 102 having a memory, a processor, an operating system, one or more software applications for executing an algorithm, and a graphical user interface (GUI) or display. It can be appreciated that the modules 170, 180, 190, 192, 194, 196 can be part of a standalone computer, or can be contained within one or more computer or processing devices 102.

Figure 2:
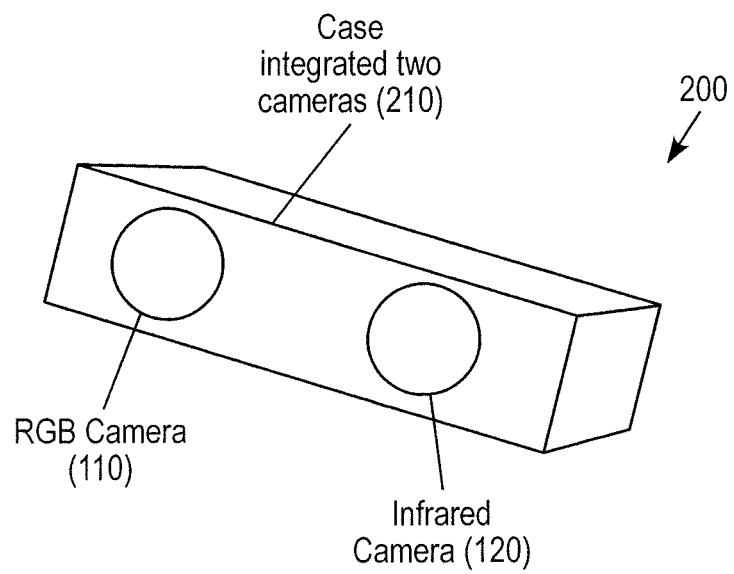
FIG. 2 is a schematic illustration of a system for vision-based projector module in accordance with an exemplary embodiment, wherein the RGB (red, green, blue) camera and the IR (Infrared) camera are integrated into a single housing or enclosure.

FIG. 2 is an illustration of system 200, wherein the RGB camera 110 and the IR camera 120 can be integrated in a single enclosure or housing 210. In accordance with an exemplary embodiment, one advantage of housing the RGB camera 110 and the IR camera 120 in a single housing or enclosure 210 is that the relative positions of the two cameras 110, 120 can be fixed such that the cameras 110, 120 can be pre-calibrated.

In accordance with an exemplary embodiment, the IR emitter (or illuminator) 130 can be configured to emit an IR lights or an IR dot pattern 300, which can include, for example, a large number of pseudo-randomly arranged rays 310. The pseudo-randomly arranged rays 310 can be emitted in an array of rays forming any shape such as circular array and/or a rectangular array.

Figure 3:
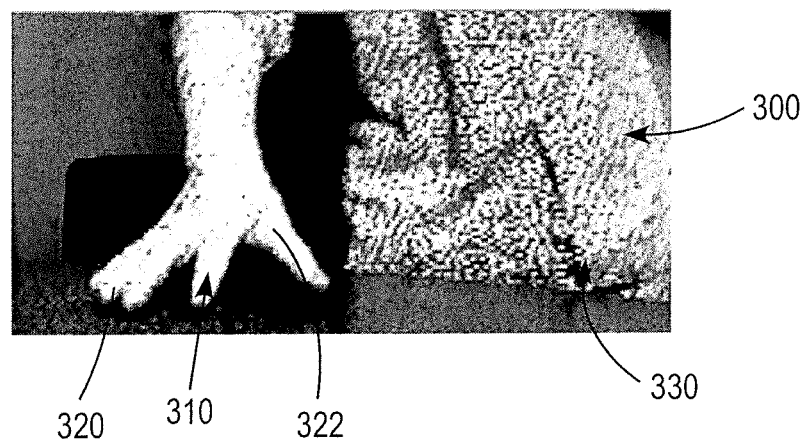
FIG. 3 is an illustration showing intensity of ray reflection on an object, which is closer to the ray source, which is higher than the intensity of others, which are farther away from the ray source.

In accordance with an exemplary embodiment, for example, as shown in FIG. 3, when an object 320, for example, a hand 322 hovers over the surface of projection region 152, the image intensity of the ray reflection on the hand 322 and the image intensity of ray reflection on the other parts of projection region 152 can be different. For example, it can be seen in FIG. 3, that the intensity of ray reflection on the hand 322 can be higher than the intensity of other parts of the projection region 152. In accordance with an exemplary embodiment, the use of an IR emitter or illuminator 130 and the corresponding properties of the emitted rays 310 can be used for example, for hand detection as disclosed herein.

FIG. 3 is an illustration showing intensity of ray reflection on an object 320, which is closer to the ray source, which is higher than the intensity of others 330, for example, the body of an individual, which is farther away from the ray source. As shown in FIG. 3, the intensity of ray reflection on an object 320 (here a hand), which is closer to the ray source is higher than the intensity of others 330 which is far from the ray source.

Figure 4:
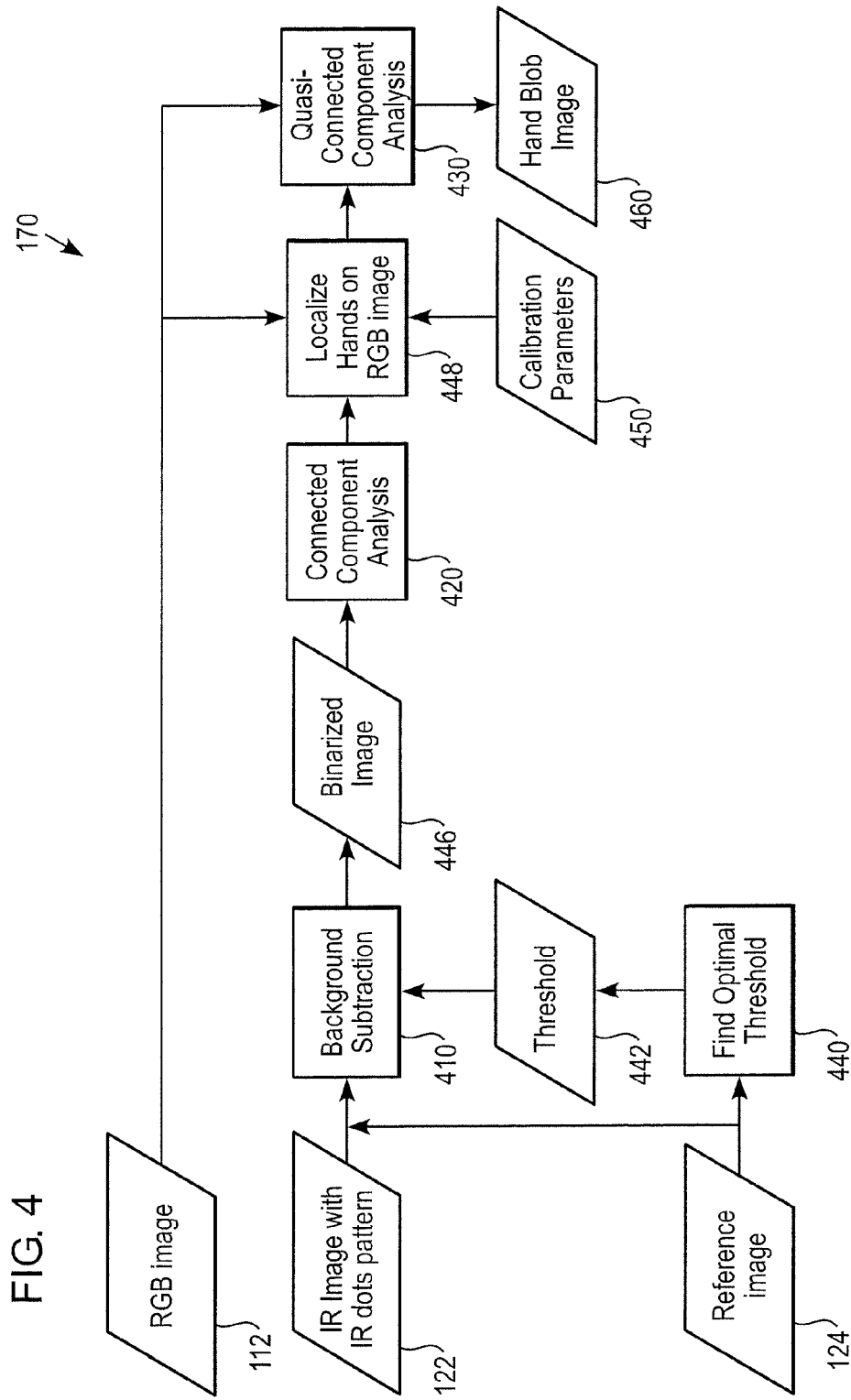
FIG. 4 is a flow chart for hand segmentation in accordance with an exemplary embodiment.

FIG. 4 is a flow chart for hand segmentation in accordance with an exemplary embodiment. In accordance with an exemplary embodiment, the hand segmentation module 170 can be used to separate a human hand 322 from other background objects in the projection region 152. As shown in FIG. 4, the hand segmentation module 170 receives the RGB image 112, the IR image 122, for example, IR image with IR dots pattern, and a reference image 124. The reference image 124 can be based on an object, for example, a hand of an individual whose hand has been previously and/or is currently be detected, or alternatively, the reference image 124 can be a reference hand, which can be input into the system 100 for use in hand detection for one or more individuals.

The RGB image 112, the IR image 122, and the reference image 124 are input into a computer processor having one or more software application and/or algorithms for processing. The one or more software applications and/or algorithms can include, for example, a background subtraction module 410, a connected component analysis module 420, and a quasi-connected component analysis module 430.

In accordance with an exemplary embodiment, the background subtraction module 410 is configured to receive the IR image 122, for example, an IR image with a IR dot pattern, which can be combined the input from the reference image 124. The reference image 124 can be subjected to an optical threshold detection 440 to generate an optimal threshold 442. Alternatively, the reference image 124, the optimal threshold 442, and the IR image 122 can be used to perform background subtraction 410, which can be directly combined with the IR image to generate a binarized image 446 as disclosed herein. After a connected component analysis process 420, a rough hand segmentation can be extracted from the binarized image 446. With calibration parameters 450, the rough hand segmentation can be mapped to the RGB image 112 so that an approximate region of hands in the RGB image 112 can be known through the module 448. After a quasi-connected component analysis 430 on the approximate hand region in the RGB image 112, an accurate hand blob image 460 can be generated.

Figure 5A:
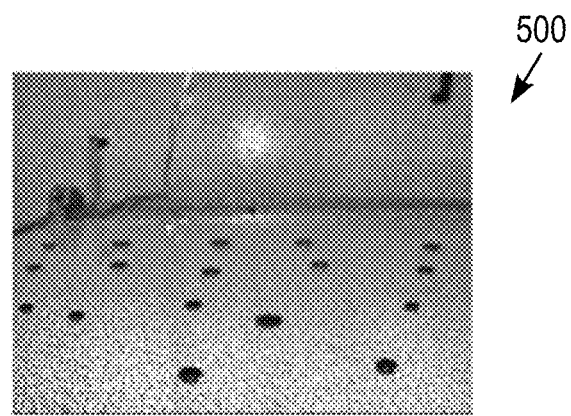
FIG. 5A is an IR image without an object present (e.g., a hand) for generating a reference image.
Figure 5B:
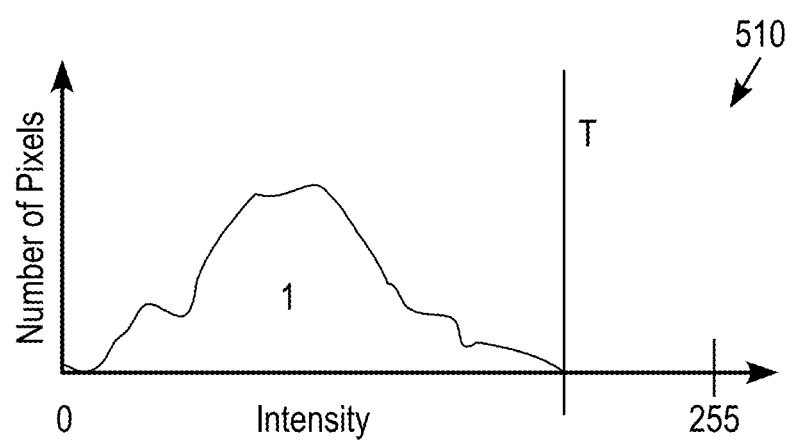
FIG. 5B is a histogram of the IR image as shown in FIG. 5A.
Figure 5C:
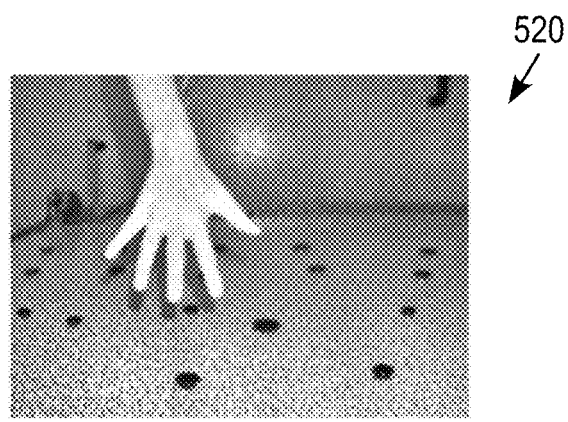
FIG. 5C is an IR image with an object present (e.g., a hand).
Figure 5D:
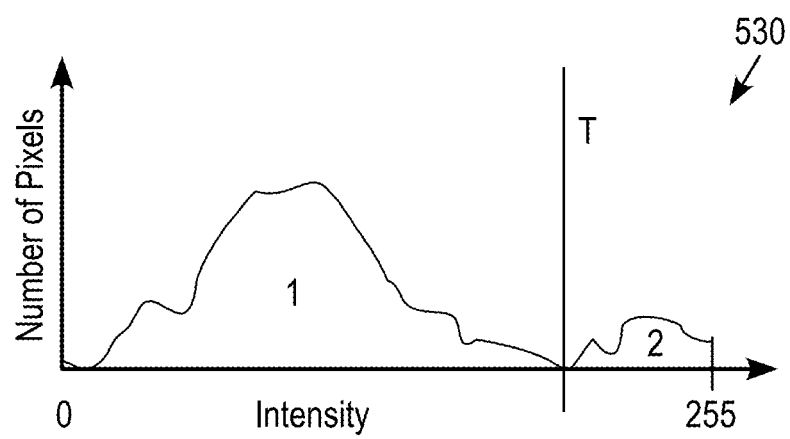
FIG. 5D is a histogram of the IR image as shown in FIG. 5C.

In accordance with an exemplary embodiment, the hand segmentation module 170 can be configured to utilize the difference between the intensity of the ray reflection on the hand surface of an individual and the intensity of ray reflection of other parts of the projection region 152 as illustrated in FIGS. 5A-5D. For example, FIG. 5A shows an IR image 500 without an object present, for example, a hand, in the image, while FIG. 5B is a histogram 510, where T is the intensity of the IR image which is higher than the intensity of other objects on the background, as can be seen the region 1 in FIG. 5C. FIG. 5C shows an IR image 520 with a hand present in the image, and FIG. 5D is the histogram 530 of this image. For example, in accordance with an exemplary embodiment, it can be seen from FIG. 5D that, the intensity value of IR rays on the hand is always above T, as can be seen the region 2 in FIG. 5D. Thus, in accordance with an exemplary embodiment, T can be the optimal threshold 440 for hand segmentation from an IR image.

FIGS. 6 and 7 are examples of results of a hand segmentation using an IR dot pattern emitter. FIG. 8 is an example of a result of hand segmentation 800, 810, 820 without using IR dot pattern emitter. In accordance with an exemplary embodiment, the light source of an IR emitter as shown in these examples can be configured to cover the whole projection surface so that the intensity of ray reflection on a hand, which is closer to the ray source, can be higher than the intensity of other background objects far from the ray source.

Figure 6A:
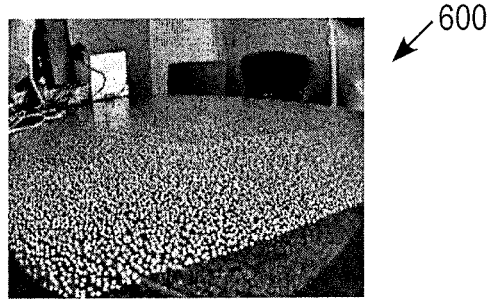
FIGS. 6A-6C illustrate a hand segmentation from a table scenario in accordance with an exemplary embodiment, which includes a reference image (FIG. 6A), an image with a hand present (FIG. 6B), and a segmented hand (FIG. 6C).
Figure 6B:
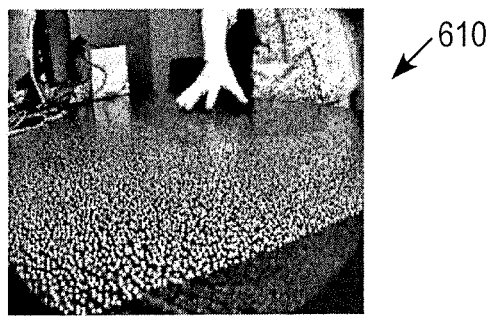
Figure 6C:
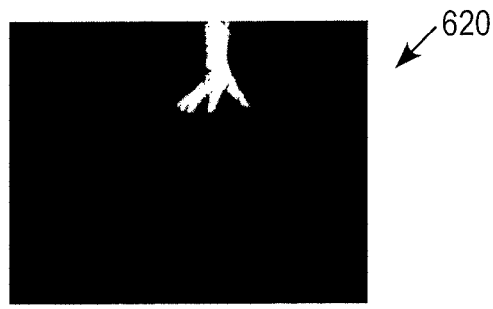
Figure 7A:
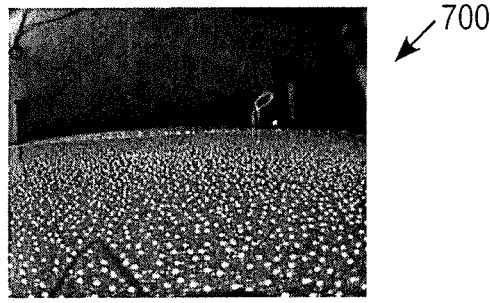
FIGS. 7A-7C illustrate a hand segmentation from a white board scenario in accordance with an exemplary embodiment, which includes a reference image (FIG. 7A), an image with a hand present (FIG. 7B), and a segmented hand (FIG. 7C).
Figure 7B:
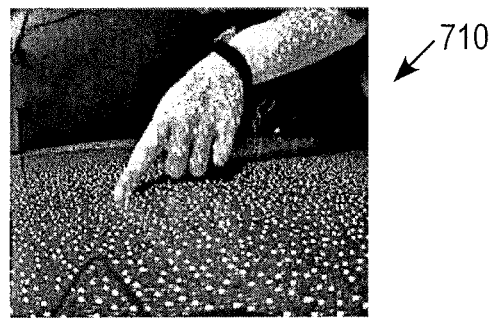
Figure 7C:
Figure 8A:
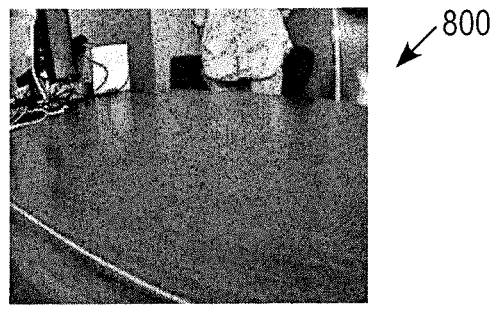
FIGS. 8A-8C illustrate a hand segmentation without using an IR dot pattern emitter, in accordance with an exemplary embodiment, which includes a reference image (FIG. 8A), an image with a hand present (FIG. 8B), and a segmented hand generated using a best threshold found from the reference image in FIG. 8A (FIG. 8C).
Figure 8B:
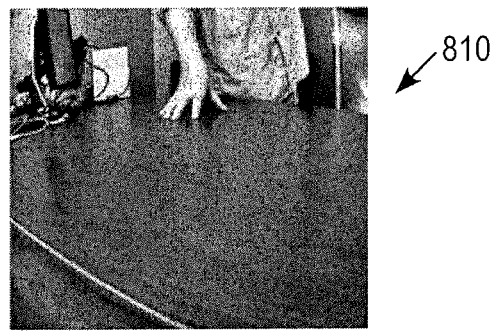
Figure 8C:

For example, FIGS. 6A-6C show a detection result 600, 610, 620 applied in table scenario while FIGS. 7A-7C gives a detection result 700, 710, 720 in a whiteboard scenario. In accordance with an exemplary embodiment, both FIG. 6C and FIG. 7C show that the hand is clearly segmented from the background when the IR dot pattern emitter is used. However, without using IR dot pattern emitter, for example, the hand can hardly be separated from other background objects as can be seen in FIG. 8C. In accordance with an exemplary embodiment, without using an IR emitter, the pixel intensity of a hand in the image can be very close to the pixel intensity of other background objects such as, for example, clothes, the computer case on the desk and the edge of the table in this image so that it cannot find a threshold to separate the hand from these background objects.

In accordance with an exemplary embodiment, to detect and track, for example, a hand using a hand detection module 190, or fingers during human-computer interaction using a finger tip detection module, a hand model 900 is needed. In accordance with an exemplary embodiment, for example, the hand model 900 can include a complex 3D hand model, a model with histogram of the image gradient direction, and/or a skeleton model as shown in FIG. 9.

Figure 9:
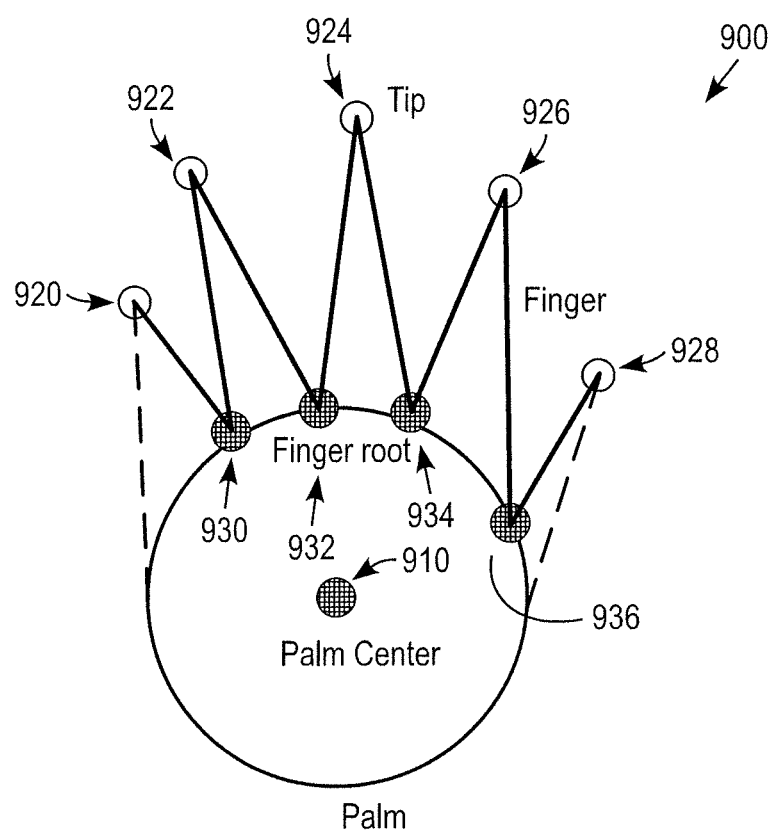
FIG. 9 is a hand model for finger and palm detection in accordance with an exemplary embodiment.

In accordance with an exemplary embodiment, for example, a hand model 900 for detecting finger tips as shown in FIG. 9 can reduce the computational complexity of the calculations as disclosed herein. In accordance with an exemplary embodiment, the hand model 900 can include a palm center 910 at the center of the hand 900, finger tips 920, 922, 924, 926, 928, and their corresponding roots 930, 932, 934, 936. As shown in FIG. 9, corresponding roots 930, 932, 934, 936 lie between each of the plurality of fingers. The geometric relations of the hand can be plotted as shown in FIG. 9, which can be utilized to find a true finger tip position.

Figure 10A:
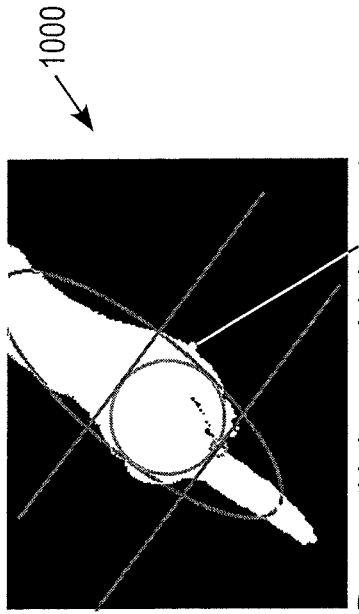
Figure 10B:
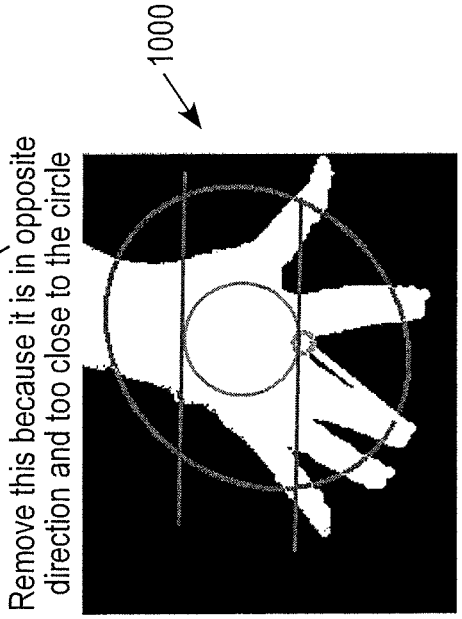
Figure 10C:
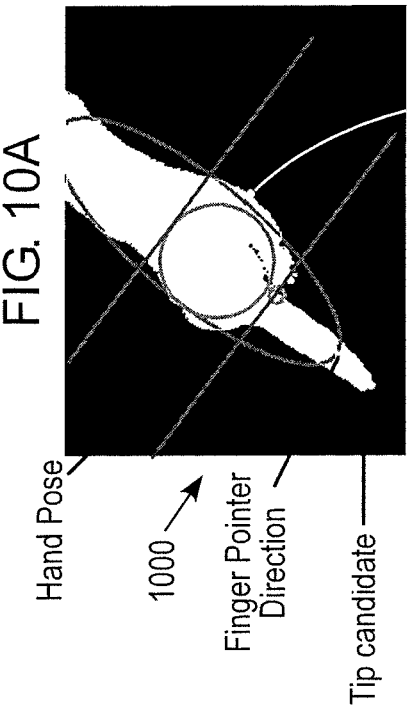

FIGS. 10A-10D illustrate the process 1000 of finding finger tips. FIG. 11 is a block diagram of the algorithm for a finger tip detection module 192 for detecting tips of fingers 1170. As shown in FIG. 11, the finger tip detection module 192 can be configured to receive segmented hand images 1110, which can be generated from a hand model 900. In step 1120, a hand profile can be extracted from the segmented hand images 1110. For example, in accordance with an exemplary embodiment, since a palm of a hand with open fingers is convex as the hand model 900 shows in FIG. 9, the shape of the hand can be approximated by ellipse parameters as shown in FIGS. 10A and 10C. Thus, for example, the hand pose can be approximated by a major and a minor axis length.

Figure 10D:
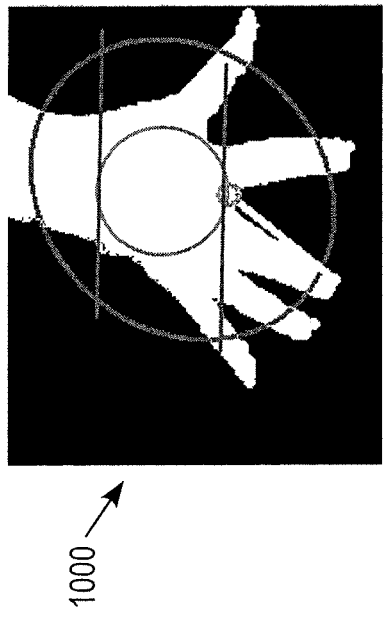
Figure 11:
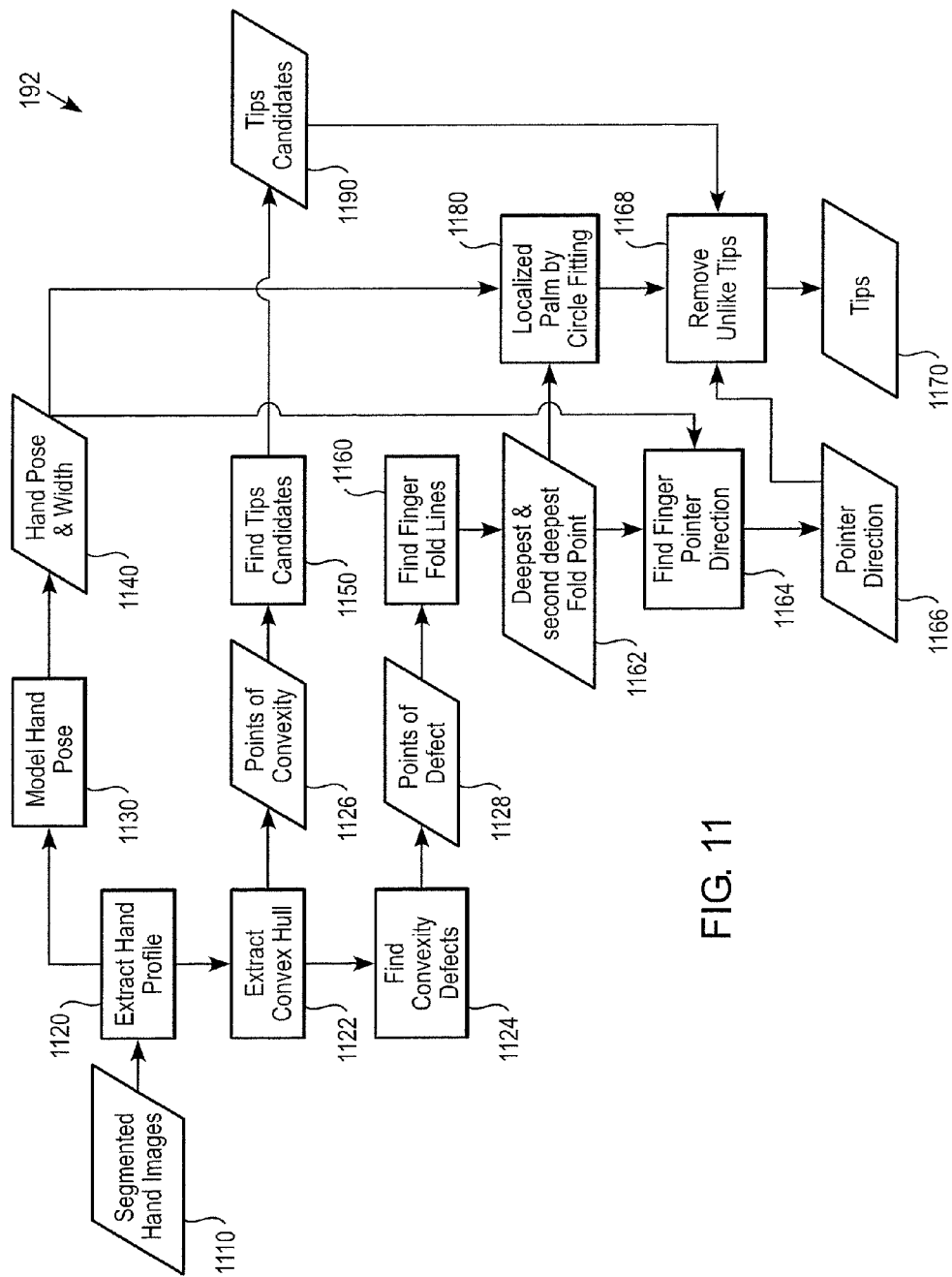
FIG. 11 is a flow chart for a finger tip detection algorithm in accordance with an exemplary embodiment.

In accordance with an exemplary embodiment, the model hand pose 1130 and the hand pose and width 1140 can be used to generate a localized palm by circle fitting in step 1180 as shown in FIGS. 10B and 10D. For example, in accordance with an exemplary embodiment, in step 1168, unlike tips can be removed to extract finger tips in step 1170.

In accordance with an exemplary embodiment, for example, to find one or more finger tips 1170, first, hand convexities (candidate tips) 1122 and convexity defects (candidate finger roots) 1124 of the hand are identified. In step 1126, the convexity points are identified and in step 1150, the convexity points have a depth of root less than a predetermined depth threshold can be removed and the tip candidates are identified (step 1190). In step 1168, unlike finger tips can be removed to extract finger tips in step 1170.

In accordance with an exemplary embodiment, in step 1128, the convexity points that have a depth of the corresponding roots, which are less than a predetermined depth threshold can be removed. In step 1160, a finger with a deepest root can be determined and other fingers that point in an opposite direction of the finger can be eliminated. In step 1162, the gravity center for the pixels between the lower boundary and the upper boundary of the palm can be found, which will be the center of the palm. For example, the radius of the palm can be the distance between the gravity center and the point of the deepest root. In step 1164, any tip points, which are close to the palm region within a given threshold, can be eliminated. In step 1166, any tips of fingers which point in an opposite direction of the deepest root can be eliminated and in step 1168, the unlike tips can be removed to extract finger tips (step 1170).

While, in the scenario of whiteboard application, for example, the camera can takes the user's full hand and the hand segmentation module as disclosed gives the blob image with a full hand. In accordance with an exemplary embodiment, since the hand is convex, the shape of the hand can be approximated by ellipse or elliptical parameters, which can provide an approximated hand pose.

In accordance with an exemplary embodiment, a touch and hover detection module 180 can be used to detect whether a finger tip contacts a touch surface. In accordance with an exemplary embodiment, once a touch incidence of a finger is detected, the finger and its associated hand can be tracked and the movement trajectory will be memorized for touch-based gesture recognition.

For example, in accordance with an exemplary embodiment, the features 1200 around the finger tip 1210 can provide differentiation between a touch or touching a surface (image on left) and hovering over a surface (image on right) is shown in FIGS. 12A and 12B. In accordance with an exemplary embodiment, the differentiation between touch and hover can be determined based on the use of Haar-like features. Haar-like features can be defined as the difference of the sum of pixels of areas inside a rectangle, which can be at any position and scale within the original image. For example, as shown in FIG. 13, seven Haar-like features 1300 can be used to describe the features between finger touch and hover.

In accordance with an exemplary embodiment, the touch and hover detection module 180 can use a machine-learning algorithm, for example, Adaboost for training a classifier to determine touch and hover. In accordance with an exemplary embodiment, the pixels can be taken around the finger edges near the tip and the seven Haar-like features of each pixel are extracted. In a classification stage, first, a contact area between a finger and the touch surface can be defined and shown in FIGS. 14A and 14B, which is depicted as a superimposed box 1400, which defines the contact region between a finger and the touch surface. If the number of pixels in the box classified as a touch pixel reaches a predetermined threshold, the finger can be classified as contacting the surface as shown in FIG. 14B. Alternatively, if the number of pixels classified as touch is below a predetermined, the module 180 can classify the finger as floating (or hovering) over the surface, as illustrated in FIG. 14A.

As shown in FIG. 2, in accordance with an exemplary embodiment, the two separated lenses from a stereo camera can capture three-dimensional images. In accordance with an exemplary embodiment, the depth of a finger tip (the distance from the surface) can be estimated through 3-D camera calibration between the IR camera and the RGB camera. The touch and hover can also be determined by the depth of a finger tip to the touch surface.

Figure 15:
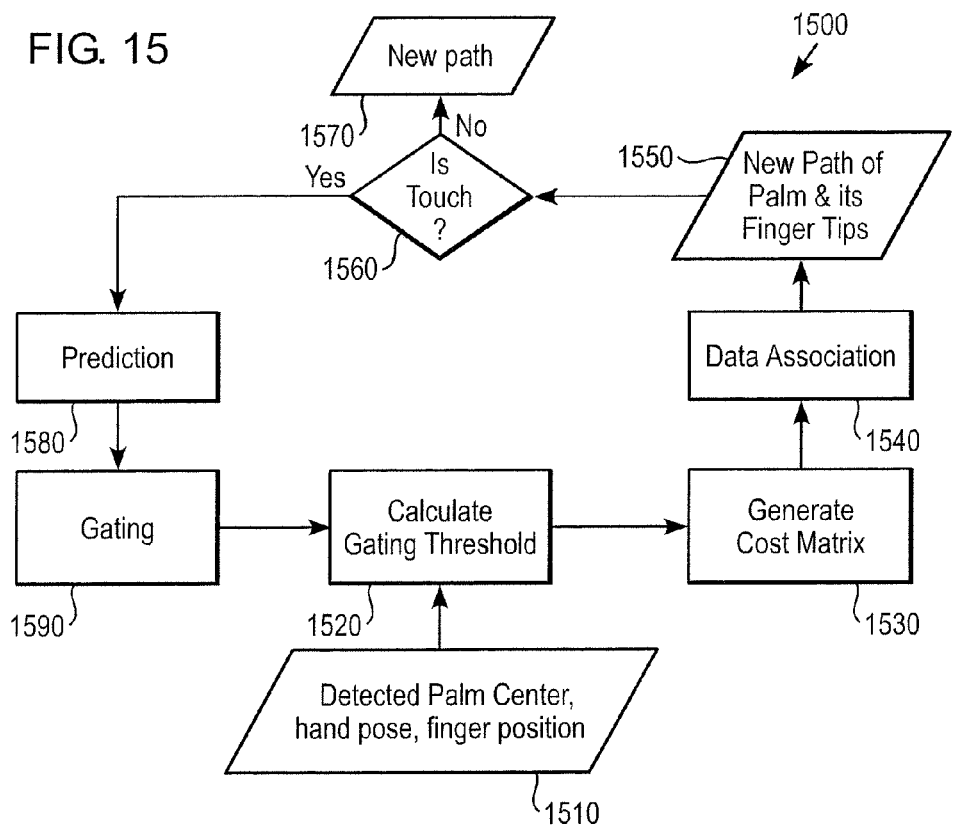
FIG. 15 is a flow chart for hand tracking in accordance with an exemplary embodiment.

In accordance with an exemplary embodiment, the hand/finger tracking approach 194 as disclosed herein can fall in the framework of a global nearest neighbor (GNN). The hand track updating process can choose the best observation that associates track. The observation is the position of the center of hand palm. The procedure of tracking 1500 is comprised of two major steps: gating and association as shown in FIG. 15. For example, in accordance with an exemplary embodiment, a gate is formed around the predicted position of the palm center as well as the predicated positions of finger tips associated with the palm by Kalman filtering.

As shown in FIG. 15, in step 1510, the palm center, the hand pose, and the finger position is detected. In step 1520, the gating threshold is calculated for the palm center, hand pose, and finger position. In steps 1530 and 1540, a cost matrix and data association is performed, which can generate a new of the palm and its finger tips as shown in step 1550. In step 1560, a touch or hover is determined. If no touch, for example, a hover can be detected, and a new path can be chosen in step 1570. Alternatively, if a touch is determined, in step 1580, a prediction can be performed, and in step 1590, a gating can be performed.

Figure 16:
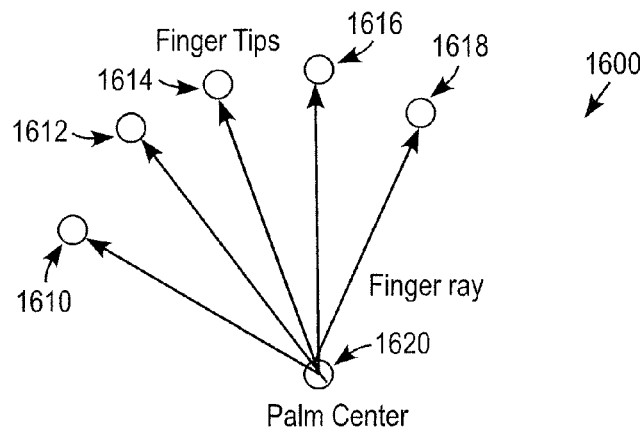
FIG. 16 is a hand model for hand tracking in accordance with an exemplary embodiment.

In accordance with an exemplary embodiment, the palm predication position can be constrained by the predicted positions of all finger tips 1610, 1612, 1614, 1616, 1618 associated with it, as shown in the hand model 1600 depicted in FIG. 16. For example, assuming that the user typically will not flip their hand when it contacts the touch surface intentionally, such parameters can assist tracking performance. Thus, in the course of fingers moving on the surface, the following constraints can be imposed in the Kalman filtering in order to achieve a relatively accurate prediction:

1) The order of finger arrangement around the palm shall not change;

2) The tips 1610, 1612, 1614, 1616, 1618 shall not overlap each other;

3) The distance between a tip 1610, 1612, 1614, 1616, 1618 and the palm center 1620 shall be consistent with its initial value;

4) The hand shall not be flipped; and

5) The rays of fingers (the palm center to tips) are in a consistent direction, for example, the angle between two consecutive fingers is less than 90 degree.

In accordance with an exemplary embodiment, all measurements that satisfy the gating relationship fall within the gate and are considered for track update. When a single measurement is gated to a single track, an assignment can be immediately made. However, when multiple measurements fall within a single gate, or when a single measurement falls within the gates of more than one track, Murphy's optimal solution can be used to solve the linear assignment problem by minimizing the summed total distance in the following cost matrix:

$$[C_{ij}] = \begin{bmatrix} c_{11} & c_{12} & c_{13} & \vdots & c_{1m} \\ c_{21} & c_{22} & c_{23} & \vdots & c_{2m} \\ \vdots & \vdots & \vdots & \vdots & \vdots \\ c_{n1} & c_{n2} & c_{n3} & \vdots & c_{nm} \end{bmatrix} \begin{matrix} 1 \\ 2 \\ \vdots \\ n \end{matrix}$$

where $$c_{ij} = \begin{cases} 120 & \text{if measurement } j \text{ is not in the gate of track } i \\ d_{ij} & \text{if measurement } j \text{ is in the gate of track } i \end{cases}$$

and $d_{ij}$ is a norm of residual vector related to prediction and measurement from Kalman filtering, in which $d_{ij}$ has $\chi^2$ distribution for correct observation-to-track pairings with M degrees of freedom and allowable probability $p=1-p_d$ of a valid observation falling outside the gate, where $P_d$ is the probability for correct detection.

In accordance with an exemplary embodiment, once the hand segmentation on an IR dots pattern image from IR camera is obtained, the system 100 needs to know the color information of its correspondent pixels on a RGB image 112 from the RGB camera 110. Thus, a geometrical mapping between the IR camera 120 and the RGB camera 110 is needed. As can be seen from FIG. 2, the IR camera and the RGB camera can be integrated in a single enclosure so that their relative position is fixed. For example, the calibration marks of circular spots emitted from a projector can have a smooth and high reflection rate so that they can be readily detected in both the IR image 122 and RGB image 112. In accordance with an exemplary embodiment, the marks can placed as dense as can to cover the entire region in RGB camera view. Detect the corresponding mark of P(Xw, Yw) on a RGB image and P(Xi, Yi) on the IR image, where w,i=1 ... N, is the index of marks. Then, Levenberg-Marquardt least square sense can be used to readily solve A and B in the following equation:

$$\begin{pmatrix} X_w \\ Y_w \end{pmatrix} = \begin{pmatrix} A^n \\ B^n \end{pmatrix} \begin{pmatrix} X_i^n \\ Y_i^n \end{pmatrix}, n = 1 \ldots K \text{ order}$$

A and B can be used for projecting the hand segment on the IR image to an approximate region on the RGB image, then shape matching can be used to align the hand profile on the both images.

In accordance with an exemplary embodiment as shown in FIG. 6C, the hand segmentation from IR image can have holes and/or missing parts. By mapping the hand segmentation to its RGB image using calibrated parameters, a quasi-connected component 430 (FIG. 4) analysis approach can be used to fill the holes and missing parts.

In accordance with an exemplary embodiment, touch screen gesture recognition 196 can be used to recognize the gestures of finger movement on the surface. For example, a feature vector including 11 features, i.e., $v=[f_1 \ldots f_{11}]$, can be used for recognizing touch screen hand gestures. FIG. 16 shows the 11 features from $f_1$ to $f_{11}$ extracted along a trajectory of a moving finger tip on the touch surface. In accordance with an exemplary embodiment, these features can be calculated by the following equations:

$$f_1 = \cos\alpha = (x_1 - x_0)/\sqrt{(x_1 - x_0)^2 + (y_1 - y_0)^2}$$

$$f_2 = \sin\alpha = (y_1 - y_0)/\sqrt{(x_1 - x_0)^2 + (y_1 - y_0)^2}$$

$$f_3 = \sqrt{(x_{max} - x_{min})^2 + (y_{max} - y_{min})^2}$$

$$f_4 = \arctan\frac{y_{max} - y_{min}}{x_{max} - x_{min}}$$

$$f_5 = \sqrt{(x_{P-1} - x_0)^2 + (y_{P-1} - y_0)^2}$$

$$f_6 = \cos\beta = (x_{P-1} - x_0)/f_5$$

$$f_7 = \sin\beta = (y_{P-1} - y_0)/f_5$$

Let $\Delta x_p = x_{p+1} - x_p$, $\Delta y_p = y_{p+1} - y_p$ $$f_8 = \sum_{p=0}^{P-2} \sqrt{\Delta x_p^2 + \Delta y_p^2}$$

Let $\theta_p = \arctan\frac{\Delta x_p \Delta y_{p-1} - \Delta x_{p-1} \Delta y_p}{\Delta x_p \Delta x_{p-1} - \Delta y_p \Delta y_{p-1}}$ $$f_9 = \sum_{p=0}^{P-2} \theta_p$$

$$f_{10} = \sum_{p=0}^{P-2} |\theta_p|$$

$$f_{11} = \sum_{p=0}^{P-2} \theta_p^2$$

Figure 17:
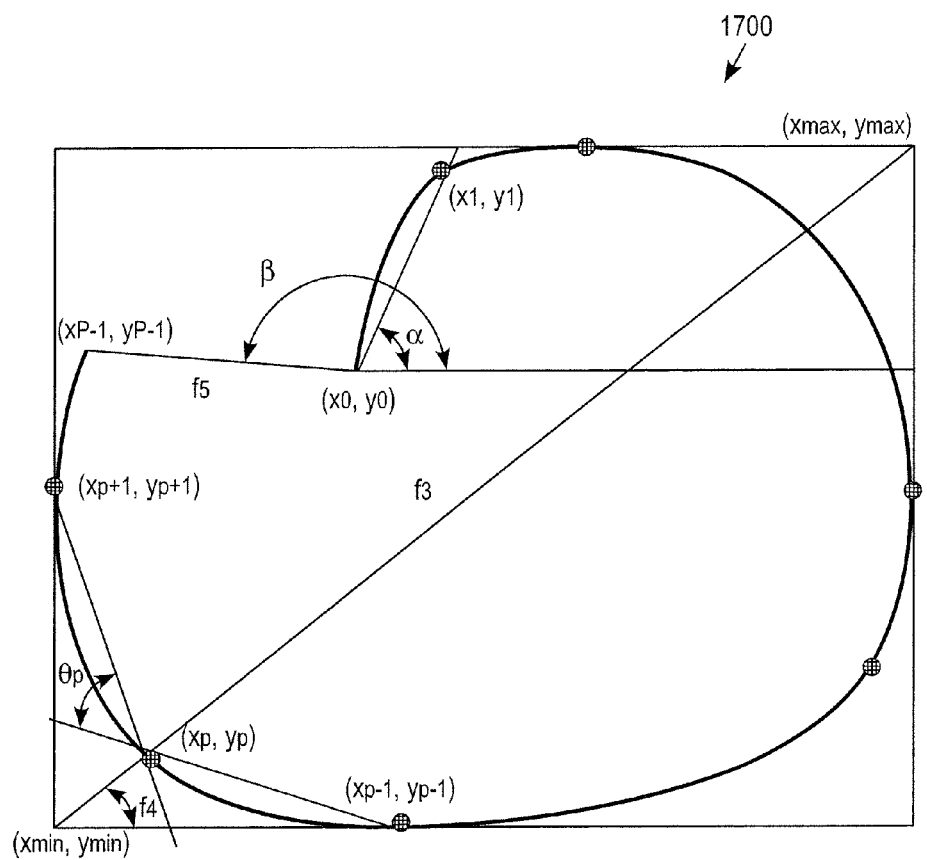
FIG. 17 is a trajectory of a finger tip on a touch surface and feature points for touch screen gesture recognition in accordance with an exemplary embodiment.

FIG. 17 is a trajectory 1700 of a finger tip on a touch surface and feature points for touch screen gesture recognition in accordance with an exemplary embodiment.

In accordance with an exemplary embodiment, a non-transitory computer readable medium containing a computer program having computer readable code embodied to carry out a method for recognizing an object is disclosed, the method comprising: emitting an array of infrared rays from an infrared emitter towards a projection region, the projection region including a first object and one or more second objects; recording an optical image of the first object and the one or more second objects; recording an infrared image of the first object and the one or more second objects, the infrared image including an image intensity of the infrared rays on the first object and the one or more second objects; and determining a location of the first object relative to the one or more second objects based on a difference between the image intensity of the infrared rays and the optical image.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for recognizing movement of a finger of a user, the method comprising:
   projecting an image onto a surface;
   emitting an array of infrared rays from an infrared emitter towards a projection region, the projection region including a hand of the user, wherein the hand of the user is located between the infrared emitter and the surface in which the image is projected, and the projection region includes at least a portion of the image projected onto the surface and the hand of the user;
   generating a reference infrared image by recording an intensity of ray reflection from the projection region without the hand of the user;
   generating a target infrared image by recording the intensity of ray reflection from the projection region with the hand of the user;
   comparing the target infrared image to the reference infrared image to generate a predetermined intensity threshold;
   extracting the hand of the user from the target infrared image, if the intensity of ray reflection of the target infrared image of the hand of the user exceeds the predetermined intensity threshold;
   wherein if the intensity of ray reflection of the target infrared image of the hand of the user exceeds the predetermined intensity threshold:
      generating a two-dimensional binarized image of the hand of the user from the target infrared image; and
      comparing the two-dimensional binarized image of the hand of the user to a model hand to detect and track movement of one or more fingers of the hand of the user and to detect contact of a finger tip with the surface upon which the image is projected, wherein the contact of the finger tip with the surface upon which the image is projected is differentiated from a hover of the finger tip by:
         detecting a plurality of pixels around an edge of the finger tip;
         superimposing a box around a region of the finger tip and a contact surface; and
         extracting Haar-like features from the box superimposed around the region of the finger tip and the contact surface, wherein the Haar-like features define a difference in a sum of pixels of rectangle areas inside the box, and then a classifier uses the Haar-like features to determine if the region looks like a predefined image with characteristics of touch or hover by determining a number of pixels in the box; and
         wherein if the number of pixels are equal to or exceeds a predetermined pixel threshold, classifying the finger tip as touching the contract surface and if the number of pixels are less than the predetermined pixel threshold, classifying the finger tip as not touching the contact surface; and
   tracking the finger and the hand upon the detection of the touch of the finger tip on the surface to recognize memorized touch-based gestures.

2. The method of claim 1, wherein the hand model comprises a palm, a plurality of finger tips, and corresponding roots between each of a plurality of fingers, and wherein generating the two-dimensional binarized image of the hand comprises:
   generating a segmented hand image from the two-dimensional binarized image of the hand;
   extracting a hand profile from the segmented hand image;
   extracting hand convexities and convexity defects from the hand profile;
   removing convexity points that have a depth of the corresponding roots, which are less than a predetermined depth threshold;
   determining a finger with a deepest root and eliminating other fingers that point in an opposite direction of the finger;
   determining a finger length from a deepest finger root along the opposite direction of the finger as an upper boundary of the palm and a lower boundary of the palm being a point of the deepest root; and
   determining a gravity center between the upper boundary and the lower boundary to define a center of the palm, and wherein a radius of the palm is a distance between the gravity center and the point of the deepest root.

3. The method of claim 2, comprising:
   eliminating any tips of fingers within a given threshold of the center of the palm;
   classifying the non-eliminated tips as finger tips.

4. The method of claim 2, comprising:
   tracking the finger tip using a global nearest neighbor, wherein the global nearest neighbor includes a gate around a predicted position of the palm center and a predicted position of finger tips associated with the palm by Kalman filtering.

5. A system for recognizing movement of a finger of a user, the system comprising:
   a projector configured to project an image onto a surface;
   an infrared emitter configured to emit an array of infrared rays from an infrared emitter towards a projection region, the projection region including the hand of a user, wherein the hand of the user is located between the infrared emitter and the surface in which the image is projected, and the projection region includes at least a portion of the image projected onto the surface and the hand of the user;
   an infrared camera configured to record an intensity of ray reflection from the projection region without the hand of the user as a reference infrared image and the intensity of ray reflection of the projection region with the hand of the user infrared image of the hand of the user as a target infrared image; and
   a processor for:
      comparing the target infrared image to the reference infrared image to generate a predetermined intensity threshold;
      extracting the hand of the user from the target infrared image, if the intensity of ray reflection of the target infrared image of the hand of the user exceeds the predetermined intensity threshold;
      generating a two-dimensional binarized image of the hand of the user from the target infrared image;

comparing the two-dimensional binarized image of the hand of the user to a model hand to detect and track movement of one or more fingers of the hand of the user and to detect contact of a finger tip with the surface upon which the image is projected, wherein the contact of the finger tip with the surface upon which the image is projected is differentiated from a hover of the finger tip by:
  detecting a plurality of pixels around an edge of the finger tip;
  superimposing a box around a region of the finger tip and a contact surface;
  extracting Haar-like features from the box superimposed around the region of the finger tip and the contact surface, wherein the Haar-like features define a difference in a sum of pixels of rectangle areas inside the box, and then a classifier uses the Haar-like features to determine if the region looks like a predefined image with characteristics of touch or hover by determining a number of pixels in the box; and
  wherein if the number of pixels are equal to or exceeds a predetermined pixel threshold, classifying the finger tip as touching the contract surface and if the number of pixels are less than the predetermined pixel threshold, classifying the finger tip as not touching the contact surface; and
tracking the finger and the hand upon the detection of the touch of the finger tip on the surface to recognize memorized touch-based gestures.

6. The system of claim 5, wherein the hand model comprises a palm, a plurality of finger tips, and corresponding roots between each of a plurality of fingers, and wherein generating the two-dimensional binarized image of the hand comprises:
  generating a segmented hand image from the two-dimensional binarized image of the hand;
  extracting a hand profile from the segmented hand image;
  extracting hand convexities and convexity defects from the hand profile;
  removing convexity points that have a depth of the corresponding roots, which are less than a predetermined depth threshold;
  determining a finger with a deepest root and eliminating other fingers that point in an opposite direction of the finger;
  determining a finger length from a deepest finger root along the opposite direction of the finger as an upper boundary of the palm and a lower boundary of the palm being a point of the deepest root; and
  determining a gravity center between the upper boundary and the lower boundary to define a center of the palm, and wherein a radius of the palm is a distance between the gravity center and the point of the deepest root.

7. The system of claim 5, comprising:
an infrared pass filter configured to increase a contrast of the intensity of ray reflection of the target and reference infrared images.

8. A non-transitory computer readable medium containing a computer program having computer readable code embodied to carry out a process for recognizing an object, the process comprising:
  projecting an image onto a surface;
  emitting an array of infrared rays from an infrared emitter towards a projection region, the projection region including a hand of a user, wherein the hand of the user is located between the infrared emitter and the surface in which the image is projected, and the projection region includes at least a portion of the image projected onto the surface and the hand of the user;
  generating a reference infrared image by recording an intensity of ray reflection from the projection region without the hand of the user;
  generating a target infrared image by recording the intensity of ray reflection from the projection region with the hand of the user;
  comparing the target infrared image to the reference infrared image to generate a predetermined intensity threshold;
  extracting the hand of the user from the target infrared image, if the intensity of ray reflection of the target infrared image of the hand of the user exceeds the predetermined intensity threshold; and
  wherein if the intensity of ray reflection of the target infrared image of the hand of the user exceeds the predetermined intensity threshold:
    generating a two-dimensional binarized image of the hand of the user from the target infrared image; and
    comparing the two-dimensional binarized image of the hand of the user to a model hand to detect and track movement of one or more fingers of the hand of the user and to detect contact of a finger tip with the surface upon which the image is projected, wherein the contact of the finger tip with the surface upon which the image is projected is differentiated from a hover of the finger tip by:
      detecting a plurality of pixels around an edge of the finger tip;
      superimposing a box around a region of the finger tip and a contact surface;
      extracting Haar-like features from the box superimposed around the region of the finger tip and the contact surface, wherein the Haar-like features define a difference in a sum of pixels of rectangle areas inside the box, and then a classifier uses the Haar-like features to determine if the region looks like a predefined image with characteristics of touch or hover by determining a number of pixels in the box; and
      wherein if the number of pixels are equal to or exceeds a predetermined pixel threshold, classifying the finger tip as touching the contract surface and if the number of pixels are less than the predetermined pixel threshold, classifying the finger tip as not touching the contact surface; and
    tracking the finger and the hand upon the detection of the touch of the finger tip on the surface to recognize memorized touch-based gestures.

9. The computer readable medium of claim 8, wherein the hand model comprises a palm, a plurality of finger tips, and corresponding roots between each of a plurality of fingers, and wherein generating the two-dimensional binarized image of the hand comprises:
  generating a segmented hand image from the two-dimensional binarized image of the hand;
  extracting a hand profile from the segmented hand image;
  extracting hand convexities and convexity defects from the hand profile;
  removing convexity points that have a depth of the corresponding roots, which are less than a predetermined depth threshold;
  determining a finger with a deepest root and eliminating other fingers that point in an opposite direction of the finger;

determining a finger length from a deepest finger root along the opposite direction of the finger as an upper boundary of the palm and a lower boundary of the palm being a point of the deepest root; and determining a gravity center between the upper boundary and the lower boundary to define a center of the palm, and wherein a radius of the palm is a distance between the gravity center and the point of the deepest root.

10. The computer readable medium of claim 9, comprising:

eliminating any tips of fingers within a given threshold of the center of the palm;

classifying the non-eliminated tips as finger tips.

11. The computer readable medium of claim 9, comprising:

tracking the finger tip using a global nearest neighbor, wherein the global nearest neighbor includes a gate around a predicted position of the palm center and a predicted position of finger tips associated with the palm by Kalman filtering.

12. The system of claim 6, wherein the processor is configured to:

eliminate any tips of fingers within a given threshold of the center of the palm;

classify the non-eliminated tips as finger tips.

13. The system of claim 6, wherein the processor is configured to:

track the finger tip using a global nearest neighbor, wherein the global nearest neighbor includes a gate around a predicted position of the palm center and a predicted position of finger tips associated with the palm by Kalman filtering.

\* \* \* \* \*